United States Patent [19]

Kaida

[11] Patent Number: 4,772,964
[45] Date of Patent: Sep. 20, 1988

[54] RECORDED DATA REPRODUCING APPARATUS CAPABLE OF PERFORMING AUTO-GAIN ADJUSTMENT

[75] Inventor: Katsuhiko Kaida, Tokyo, Japan

[73] Assignee: Kabushiki Kaisha Toshiba, Kawasaki, Japan

[21] Appl. No.: 932,021

[22] Filed: Nov. 18, 1986

[30] Foreign Application Priority Data

Nov. 30, 1985 [JP] Japan .................. 60-269606
Jan. 31, 1986 [JP] Japan .................. 61-17815

[51] Int. Cl.$^4$ .......................... G11B 5/02; G11B 5/09
[52] U.S. Cl. ........................................ 360/67; 360/46
[58] Field of Search ................ 360/39, 46, 65, 67

[56] References Cited

U.S. PATENT DOCUMENTS

| | | | |
|---|---|---|---|
| 3,660,821 | 5/1972 | Weber et al. | 360/67 |
| 4,298,898 | 11/1981 | Cardot | 360/39 |
| 4,306,257 | 12/1981 | Harman | 360/67 |
| 4,346,411 | 8/1982 | Buhler et al. | 360/67 |
| 4,392,164 | 7/1983 | Leguien | 360/67 |
| 4,479,152 | 10/1984 | Chi | 360/65 |
| 4,495,531 | 1/1985 | Sasamura | 360/67 |
| 4,564,869 | 1/1986 | Baumeister | 360/46 |
| 4,578,723 | 3/1986 | Betts et al. | 360/67 |

*Primary Examiner*—Raymond F. Cardillo
*Assistant Examiner*—Surinder Sachar
*Attorney, Agent, or Firm*—Oblon, Fisher, Spivak, McClelland, & Maier

[57] ABSTRACT

A recorded data reproducing apparatus according to the invention includes a memory section having a gain data table for storing gain data determined in accordance with a cylinder position above a recording medium. Using the data representing the current cylinder position, the optimum gain data is determined from the gain data table, and supplied to a read pulse generator section under control by a control section. With this arrangement, the gain adjusting circuit is simplified, and the gain adjustment process is also simplified.

6 Claims, 3 Drawing Sheets

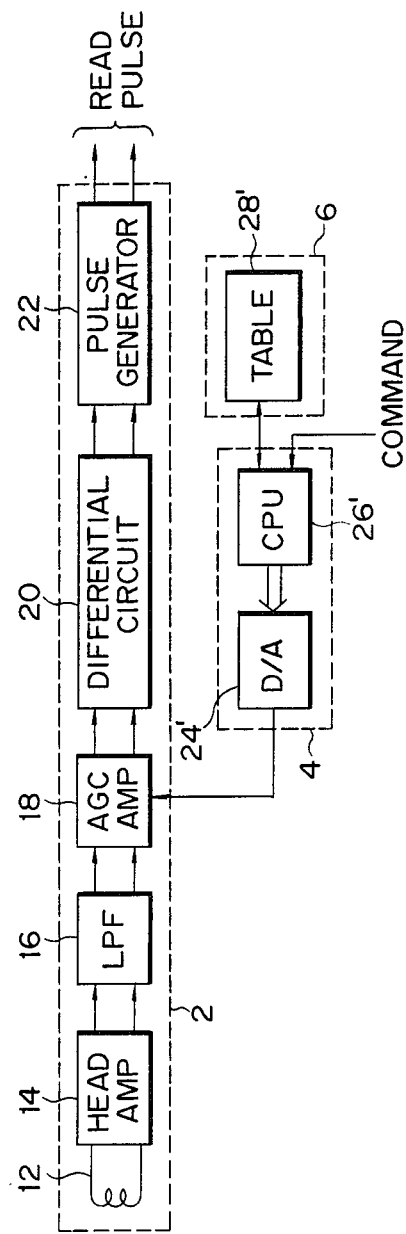
F I G. 4
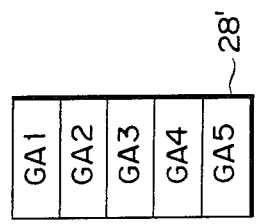
F I G. 5

RECORDED DATA REPRODUCING APPARATUS CAPABLE OF PERFORMING AUTO-GAIN ADJUSTMENT

BACKGROUND OF THE INVENTION

This invention relates to a recorded data reproducing apparatus for use with hard disk devices, and more particularly to a recorded data reproducing apparatus having simple circuitry, and which is easy to assemble and adjust.

In hard disk devices, the level of the signal read out from a magnetic head changes according to the track or cylinder position on the magnetic recording medium. Specifically, when the magnetic head is positioned above an inner track on the magnetic recording medium, the signal level is low. When it is positioned above an outer track, the signal level is high. In order to use such signals output from the magnetic head, for subsequent data processing, the varying signal level must be adjusted to an appropriate level.

To cope with this problem, the conventional recorded data reproducing apparatus for use with a hard disk device performs gain adjustments, using an auto-gain control (AGC) generator. To adjust the gain, the signal, amplified by an amplifier, is rectified and smoothed, and is then supplied to the AGC generator. The AGC generator outputs an AGC signal to the amplifier, in accordance with the input; thus, the amplified signal is fed back to the amplifier.

The AGC generator, however, requires complicated circuitry. To perform gain adjustment of the amplifier of the AGC generator, manual operation by means of a variable resistor is required. There are many problems in which the number of assembly steps of the apparatus is increased, and the assembly is thus complicated.

SUMMARY OF THE INVENTION

Accordingly, an object of this invention is to provide a recorded data reproducing apparatus wherein the circuit arrangement can be simplified, as can any adjustments necessary, during the manufacturing stage.

According to this invention, there is provided a recorded data reproducing apparatus capable of simplifying a gain adjustment comprising:

read pulse generating means for reading out data from a recording medium, for amplifying a signal corresponding to the read-out data in accordance with input gain data, for differentiating the amplified signal to detect the peak value, and for generating a read pulse on the basis of the detected peak value;

memory means for storing a gain data table tabulating the gain data; and control means for referring to the gain data table in accordance with an input read command to determine an optimum gain data, and for outputting the determined gain data to the read pulse generating means.

The apparatus further includes temperature detecting means for detecting ambient temperature.

With such an arrangement, the gain of the AGC amplifier can be adjusted to an appropriate value by preparing the gain data, which is dependent on a position of the magnetic head and a variation of ambient temperature. Therefore, the AGC amplifier can be operated at an appropriate gain, dependent on the position of the magnetic head and temperature variation, without complicated circuitry or adjustments.

BRIEF DESCRIPTION OF THE DRAWINGS

FIG. 4 is a block diagram illustrating an arrangement of another embodiment of this invention; and FIG. 5 shows the contents of the gain data table used in the embodiment of FIG. 4.

DETAILED DESCRIPTION OF THE PREFERRED EMBODIMENTS

A detailed description of an embodiment of a recorded data reproducing apparatus according to this invention will be given with reference to the accompanying drawings.

Figure 1:
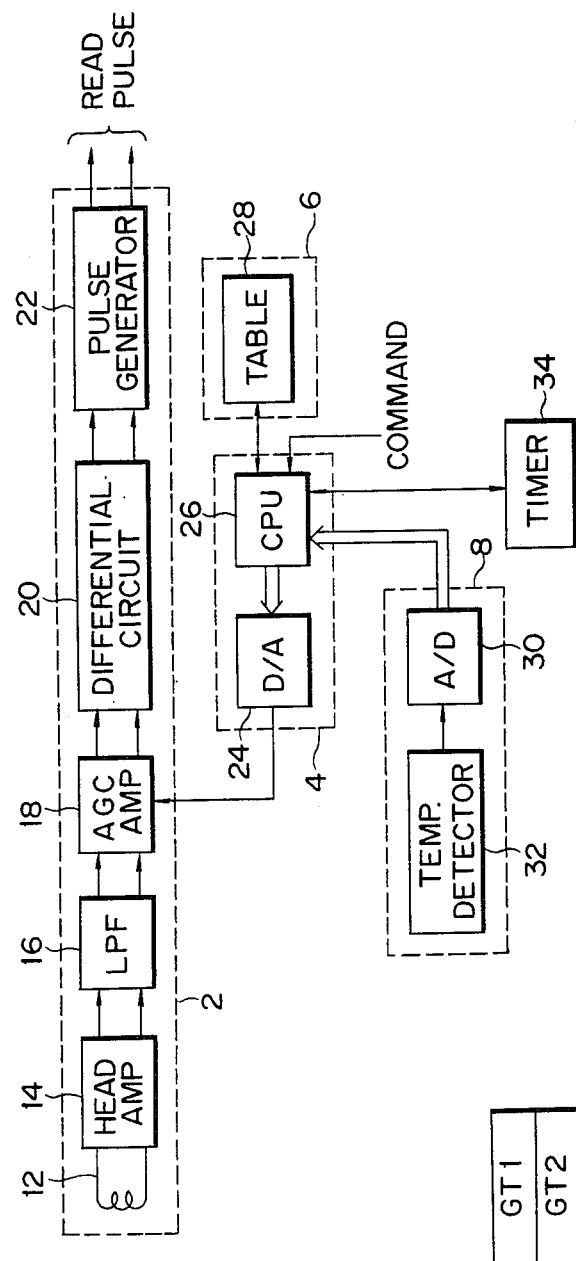
FIG. 1 is a block diagram showing an embodiment of a recorded data reproducing circuit according to the present invention.

The configuration of the embodiment will first be described with reference to FIG. 1. This recorded data reproducing apparatus includes read pulse generator section 2, control section 4, memory section 6, timer 34, and temperature detector section 8.

Read pulse generator section 2 comprises magnetic head 12 for reading out the data from the magnetic recording medium, head amplifier 14 for amplifying the signal read out by head 12, and low pass filter (LPF) 16 for removing the noise from the signal amplified by amplifier 14. Generator section 2 further includes automatic gain control amplifier (AGC amplifier) 18 for amplifying the output from LPF 16 according to input gain data, differential circuit 20 for detecting peaks of the read-out signal, and pulse generator 22 for outputting the read pulse on the basis of the detected peaks of the read-out signal.

Control section 4 is composed of CPU 26, which performs a variety of control functions, and D/A converter 24, which converts digital data output from CPU 26 to analog data.

Figure 2:
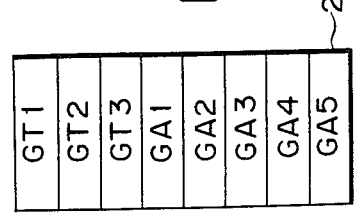
FIG. 2 shows a view illustrating the contents of a gain data table used in the embodiment of FIG. 1.

Memory section 6 contains gain data table 28. This gain data table 28 is configured as shown in FIG. 2. Gain data table 28 will be explained later. Memory section 6 includes, in addition to gain data table 28, register CY (not shown) used to store data representing the current cylinder position of head 12, and register TE (not shown) for storing detected temperature data.

Temperature detector section 8 is made up of temperature detector 32, which detects the ambient temperature, and A/D converter 30, which converts analog temperature data detected by detector 32 into digital data.

Timer 34 is used to determine the time interval of detecting the temperature by means of temperature detector 32. After a predetermined time has elapsed, timer 34 generates an elapsed-time interrupt for CPU 26.

Referring to FIG. 2, GA1 to GA5 are gain data dependent on the cylinder data, which is referred to according to the cylinder data stored in register CY. GT1 to GT3 are gain data dependent on the temperature data stored in register TE. In this example, the gain data dependent on the cylinder positions are classified into 5 steps. The temperature-dependent gain data is classified into 3 steps. However, the number of steps is not limited to those above, but may be any desired number, if necessary.

Figure 3:
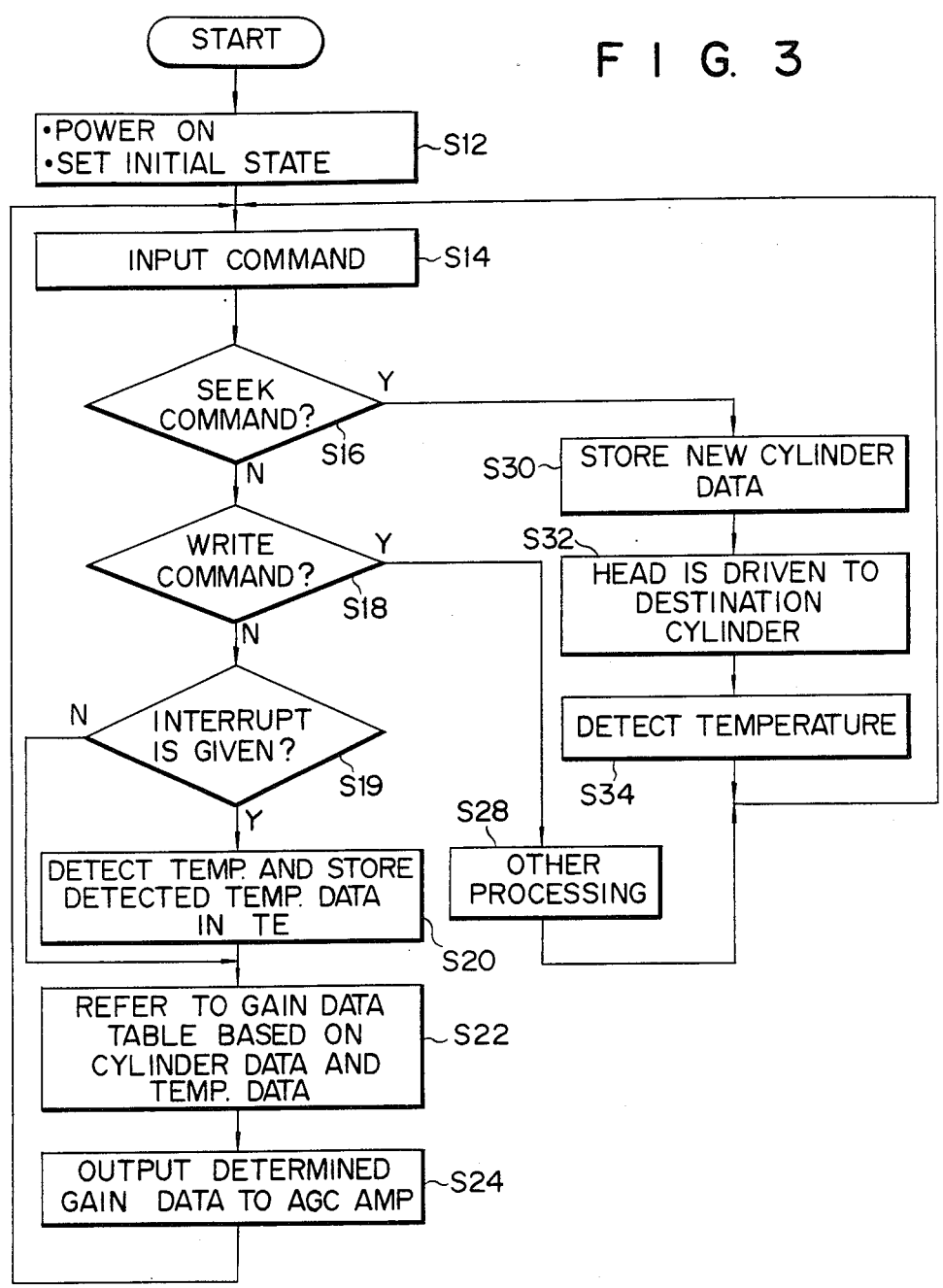
FIG. 3 shows a flowchart used to explain the operation of the embodiment of FIG. 1.

Next, the operation of this embodiment will be explained, with reference to FIG. 3.

The power supply of the hard disk device is turned on, and initial settings and processings, such as detection of the zero track position, are made (step S12). At this time, if a RAM is used for gain data table 28, the gain data is written into gain data table 28. If gain data table 28 is configured by a ROM, such a write operation is not necessary. After that, in step 14, the apparatus will wait for an input command.

In steps S16 and S18, the input commands are checked. In step S16, it is checked if the input command is a seek command or not. If N in step 16, step S18 is executed. In step S18, it is checked if the input command is a write command or not. If N in step 18, the command is determined to be a read command.

In step S19, it is determined if an interrupt has been generated from timer 34 or not. If it has been generated, step S20 is executed. If not, step S22 is executed, so that the temperature data up to the present time can be used.

In step S20, the ambient temperature is detected by temperature detector 32. After the detected temperature data is converted into digital data by A/D converter 30, it is fed through CPU 26, and stored in the register TE of memory section 63. In step S22, gain data table 28 is referred to according to the contents of registers CY and TE, and appropriate data is read out.

In step S24, the cylinder position-dependent gain data and temperature-dependent gain data, read out from gain data table 28, are combined in accordance with a predetermined procedure, and the combined data is output to AGC amplifier 18.

After that, the flow returns to step S14.

Through the above sequence of operations, head 12 reads out the data at its current position. A signal corresponding to read-out data is amplified by head amplifier 14, and then it is supplied to AGC amplifier 18. Since the gain data is already supplied to AGC amplifier 18 from control section 26 in step S24, the AGC amplifier amplifies the input signal in accordance with the input gain data, and outputs the amplified signal to differential circuit 20.

In differential circuit 20, the signal from AGC amplifier 18 is differentiated to detect the peak position and is then output to pulse generator 22. Generator 22 outputs a pulse signal which changes when the signal corresponding to the peak signal detected by differential circuit 20 crosses the zero level. This pulse signal is used as a read pulse.

If the answer in step S18 is YES, that is, if the command is determined to be a write command, step 28 is executed and processing is performed in accordance with the command. Then, the flow returns to step S14.

If the answer in step S16 is YES (if the command is seek command), step S30 is executed. In step S30, data representing the cylinder position assigned by the seek command is stored in register CY. After that, in step S32, head 12 is driven to the destination cylinder. When head 12 reaches the destination cylinder, the ambient temperature is measured by temperature detector 32. After the measured temperature data is converted to digital data by A/D converter 30, CPU 26 stores this data in register TE. After that, the flow returns to step S14 gain.

The recorded data reproducing apparatus according to this invention operates as described above. In this case, since the gain of AGC amplifier 18 can be set according to the gain data in a gain data table, a gain adjustment operation is not needed after the circuit has been manufactured. Also, since most of the circuits necessary for the gain adjustment operation can be configured by digital circuits, circuit construction is comparatively easy. Furthermore, by storing the predetermined fixed gain data into the gain data table, the measurement of the electromagnetic characteristics of magnetic head 12 can be performed easily. In other words, the electromagnetic characteristics of the magnetic head can be measured based on the read-out signal of the magnetic head, which is amplified by the AGC amplifier with a gain in accordance with the fixed gain data.

In this embodiment, when a read command is input, if there is no interrupt from the timer, the operation of a temperature measurement is not executed. If necessary, the operation can be set so that temperature measurements will be performed each time the read command is input. In such case, there would be no need for the timer.

To update the temperature data, when an interrupt is generated from the timer, a seek operation request can be output to an external unit to measure the temperature. The measurement of temperature may only be accomplished by generation of an interrupt.

Another embodiment of this invention will be described, referring to FIG. 4. In comparison with the embodiment of FIG. 1, temperature detector section 8 and timer 34 are not used and gain data table 28 does not contain temperature-dependent gain data. Accordingly, when the disk equipment is used at a nearly constant temperature, or when there is more margin than needed, the configuration shown in FIG. 1 is the simpler one.

What is claimed is:

1. A recorded data reproducing apparatus capable of performing a gain adjustment based on cylinder position and temperature, comprising:
    read pulse generating means for reading out data from a recording medium by a head, for amplifying a signal corresponding to the read-out data in accordance with input gain data, for differentiating the amplified signal to detect a peak value of the amplified signal, and for generating a read pulse in accordance with the detected peak value;
    temperature detecting means for detecting ambient temperature to generate temperature data;
    memory means including a gain data table for storing cylinder position-dependent gain data, temperature-dependent gain data, for storing input cylinder position data and input temperature data; and
    control means comprising means for outputting the temperature data generated by said temperature detecting means to said memory means, means for outputting the cylinder position data designated by an input seek command to said memory means in response to the seek comand, and means responsive to an input read command, for controlling said temperature detecting means to generate the temperature data, for referring to said gain data table in accordance with the cylinder position data and the temperture data stored in said memory means to obtain the cylinder position-dependent gain data relative to the cylinder position data and the temperature-dependent gain data relative to the temperature data, and for determining the gain data from the obtained cylinder position-dependent gain data and the obtained temperature-dependent gain data to output the determined gain data to said read pulse generating means.

2. The apparatus according to claim 1, further comprising timer means for counting time, and for generating an interrupt to said control means every predetermined time, and wherein said control means further comprises means for controlling said temperature detecting means to generate the temperature data, in accordance with the interrupt from said timer means, and for resetting said timer means when the temperature data is generated by said temperature detecting means.

3. The apparatus according to claim 2, wherein said control means further includes means for resetting said timer means in accordance with the read command.

4. A recorded data reproducing apparatus capable of performing a gain adjustment based on cylinder position and temperature, comprising:

read pulse generating means for reading out data from a recording medium by a head, for amplifying a signal corresponding to the read-out data in accordance with input gain data, for differentiating the amplified signal to detect a peak value of the amplified signal, and for generating a read pulse in accordance with the detected peak value;

temperature detecting means for detcting ambient temperature to generate temperature data;

memory means including a gain data table for storing cylinder position-dependent gain data, temperature-dependent gain data, for storing input cylinder position data and input temperature data; and control means comprising means for outputting the temperature data generated by said temperature detecting means to said memory means, means responsive to an input seek command, for outputting the cylinder position data designated by the seek command to said memory means, and for controlling said temperature detecting means to generate the temperature data, and means responsive to an input read command, for referring to said gain data table in accordance with the cylinder position data and the temperature data stored in said memory means to obtain the cylinder position-dependent gain data relative to the cylinder position data and the temperature-dependent gain data relative to the temperature data, and for determining the gain data from the obtained cylinder position-dependent gain data and the obtained temperature-dependent gain data to output the determined gain data to said read pulse generating means.

5. The apparatus according to claim 4, further comprising timer means for counting time, and for generating an interrupt to said control means every predetermined time, and wherein said control means further comprises means for controlling said temperature detecting means to generate the temperature data, in accordance with the interrupt from said timer means, and for resetting said timer means when the temperature data is generated by said temperature detcting means.

6. A recorded data reproducing apparatus capable of performing a gain adjustment based on cylinder position and temperature, comprising:

read pulse generating means for reading out data from a recording medium by a head, for amplifying a signal corresponding to the read-out data in accordance with input gain data, for differentiating the amplified signal to detect a peak value of the amplified signal, and for generating a read pulse in accordance with the detected peak value;

temperature detecting means for detecting ambient temperature to generate temperature data;

memory means including a gain data table for storing cylinder position-dependent gain data, temperature-dependent gain data, for storing input cylinder position data and input temperature data;

timer means for counting time, and for generating an interrupt every predetermined time; and control means comprising means for outputting the temperature data generated by said temperature detecting means to said memory means, means for outputting the cylinder position data designated by an input seek command to said memory means in response to the seek command, for controlling said temperature detecting means to generate the temperature data, in accordance with the interrupt from said timer means, and means response to an input read command, for referring to said gain data table in accordance with the cylinder position data and the temperature data stored in said memory means to obtain the cylinder position-dependent gain data relative to the cylinder position data and the temperature-dependent gain data relative to the temperature data, and for determining the gain data from the obtained cylinder position-dependent gain data and the obtained temperature-dependent gain data to output the determined gain data to said read pulse generating means.

* * * * *